United States Patent
Richardson et al.

(10) Patent No.: US 9,995,400 B2
(45) Date of Patent: Jun. 12, 2018

(54) THERMALLY COMPENSATED VALVE TRIM COMPONENT

(71) Applicant: FISHER CONTROLS INTERNATIONAL LLC, Marshalltown, IA (US)

(72) Inventors: Jonathan W. Richardson, Marshalltown, IA (US); Timothy Randall Parrie, Mingo, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 73 days.

(21) Appl. No.: 14/995,394

(22) Filed: Jan. 14, 2016

(65) Prior Publication Data
US 2016/0223088 A1    Aug. 4, 2016

Related U.S. Application Data

(60) Provisional application No. 62/111,997, filed on Feb. 4, 2015.

(51) Int. Cl.
| | | |
|---|---|---|
| *F16K 1/32* | (2006.01) | |
| *F16K 1/34* | (2006.01) | |

(Continued)

(52) U.S. Cl.
CPC ............ *F16K 1/32* (2013.01); *F16K 1/36* (2013.01); *F16K 1/482* (2013.01); *F16K 1/487* (2013.01)

(58) Field of Classification Search
CPC ..... Y10T 137/86718; Y10T 137/86734; Y10T 137/86759; F16K 1/32; F16K 1/34;
(Continued)

(56) References Cited

U.S. PATENT DOCUMENTS

| | | |
|---|---|---|
| 2006/0048826 A1 | 3/2006 | Gossett et al. |
| 2007/0040136 A1 | 2/2007 | Caprera |

(Continued)

OTHER PUBLICATIONS

Bush, Don; Colbat-base Alloy 6; Oct. 14, 2010; Valve Magazine.com; http://www.valvemagazine.com/magazine/sections/materials-q-a/4257-cobalt-base-alloy-6.html.*

(Continued)

*Primary Examiner* — Kevin Murphy
*Assistant Examiner* — Kelsey Cary
(74) *Attorney, Agent, or Firm* — Marshall, Gerstein & Borun LLP

(57) ABSTRACT

A thermally compensated valve trim component for a fluid flow control device is provided. The valve trim component includes a base and a sleeve coupled to the base. The base is formed of a first material having a first thermal expansion coefficient, while the sleeve is formed of a second material having a second thermal expansion coefficient different from the first thermal expansion coefficient. The valve trim component further includes a thermal compensating apparatus arranged within a gland defined between the base and the sleeve. The thermal compensating apparatus is formed of a third material having a third thermal expansion coefficient different from the first and second thermal expansion coefficients, such that the thermal compensating apparatus minimizes a resultant thermal expansion differential of the valve trim component.

20 Claims, 3 Drawing Sheets

(51) Int. Cl.
*F16K 1/48* (2006.01)
*F16K 1/36* (2006.01)

(58) Field of Classification Search
CPC ... F16K 1/36; F16K 1/48; F16K 1/482; F16K 1/485; F16K 1/487
USPC ......... 251/368, 318, 356, 366, 367, 358, 85, 251/324; 137/625.28, 625.3, 625.33
See application file for complete search history.

(56) References Cited

U.S. PATENT DOCUMENTS

| | | |
|---|---|---|
| 2010/0140530 A1 | 6/2010 | Robison |
| 2011/0226980 A1* | 9/2011 | Richardson ............. F16K 47/04 251/368 |
| 2012/0235069 A1 | 9/2012 | Richardson et al. |

OTHER PUBLICATIONS

International Search Report for Application No. PCT/US2016/016492 dated May 23, 2016.
Written Opinion for Application No. PCT/US2016/016492 dated May 23, 2016.

* cited by examiner

THERMALLY COMPENSATED VALVE TRIM COMPONENT

FIELD OF THE DISCLOSURE

The present disclosure generally relates to fluid flow control devices, and, more particularly, to a thermally compensated valve trim component for a fluid flow control device.

BACKGROUND

Process control systems typically include various components for controlling various process parameters. For example, a fluid process control system may include a plurality of control valves for controlling flow rate, temperature, and/or pressure of a fluid flowing through the system. The end product is dependent on the accuracy of the control of these parameters, which is, in turn, dependent on the geometry and characteristics of the control valves. Control valves are, for example, specifically designed and selected to provide for particular flow capacities and pressure changes. When these characteristics are compromised, the quality of the end product may be affected.

A control valve typically includes components such as a valve body, a valve trim assembly (e.g., a flow control member, a valve stem, a valve seat), and an actuator configured to operably position the flow control member within the valve body. In some cases, it may be desirable (e.g., for cost reasons) to manufacture some of these components, for example a valve trim component of the valve trim assembly, from two or more different materials. However, the valve trim component, by virtue of being made from different materials (which in turn have different thermal expansion coefficients), will have different portions having different thermal expansion coefficients, thereby producing differential expansion between the different portions of the valve trim component when the control valve is used at different temperatures (particularly at elevated temperatures). Such differential thermal expansion may undesirably compromise the characteristics of the control valve, thereby affecting the quality of the end product. Worse yet, differential thermal expansion may eventually cause the valve trim component to fail.

SUMMARY

In accordance with a first exemplary aspect, a thermally compensated valve trim component for a fluid flow control device is provided. The valve trim component includes a base and a sleeve coupled to the base. The base is formed of a first material having a first thermal expansion coefficient, while the sleeve is formed of a second material having a second thermal expansion coefficient different from the first thermal expansion coefficient. The valve trim component further includes a thermal compensating apparatus arranged within a gland defined between the base and the sleeve. The thermal compensating apparatus is formed of a third material having a third thermal expansion coefficient different from the first and second thermal expansion coefficients, such that the thermal compensating apparatus minimizes a resultant thermal expansion differential of the valve trim component.

In accordance with a second exemplary aspect, a fluid flow control device is provided. The fluid flow control device includes a valve body and a valve trim assembly disposed within the valve body. The valve body defines an inlet, an outlet, and a fluid flow path extending between the inlet and the outlet. The valve trim assembly is disposed within the valve body and includes a valve seat, a valve cage, and a flow control member. The valve seat is disposed within the valve body and defines an orifice through which the fluid flow path passes. The valve cage is coupled to the valve seat within the valve body and defines an interior bore. The flow control member is sized for insertion into the interior bore of the valve cage and is movable along an axis between a closed position, in which the flow control member engages the valve seat ring, and an open position in which the flow control member is spaced from the valve seat ring. The flow control member includes a base, a sleeve coupled to the body, and a thermal compensating apparatus arranged within a gland defined between the base and the sleeve. The base is formed of a first material having a first thermal expansion coefficient, while the sleeve is formed of a second material having a second thermal expansion coefficient different from the first thermal expansion coefficient. The thermal compensating apparatus is formed of a third material having a third thermal expansion coefficient different from the first and second thermal expansion coefficients, such that the thermal compensating apparatus minimizes a resultant thermal expansion differential of the flow control member.

In accordance with a third exemplary aspect, a thermally compensated valve trim component for a fluid flow control device is provided. The valve trim component includes a base and a sleeve coupled to the base. The base includes a body and a stud extending outwardly from the body. The base is formed of a first material having a first thermal expansion coefficient. The sleeve includes a body and a circumferential wall extending upwardly from the body. The sleeve is formed of a second material having a second thermal expansion coefficient different from the first thermal expansion coefficient. The valve trim component further includes a thermal compensating apparatus arranged within a gland defined between the stud of the base and the circumferential wall of the sleeve. The thermal compensating apparatus is formed of a third material having a third thermal expansion coefficient different from the first and second thermal expansion coefficients, such that the thermal compensating apparatus minimizes a resultant thermal expansion differential of the valve trim component.

In further accordance with any one or more of the foregoing first, second, or third exemplary aspects, a thermally compensated valve trim component and/or a fluid flow control device may include any one or more of the following further preferred forms.

In one preferred form, a fastener is secured to a portion of the base to couple the sleeve to the base.

In another preferred form, the base includes an outwardly extending stud. The stud can be disposed in an interior bore formed in the sleeve.

In another preferred form, the thermal compensating apparatus surrounds a portion of the outwardly extending stud.

In another preferred form, the stud has a threaded portion configured to threadingly engage a mating threaded portion of the fastener.

In another preferred form, the sleeve is formed of Carbide.

In another preferred form, the base is formed of a superalloy material.

In another preferred form, the fastener is formed of Alloy 6.

In another preferred form, the first thermal expansion coefficient is greater than the second thermal expansion coefficient, and the third thermal expansion is greater than the second thermal expansion coefficient.

In another preferred form, the third thermal expansion coefficient is greater than the first thermal expansion coefficient.

DETAILED DESCRIPTION

Figure 1:
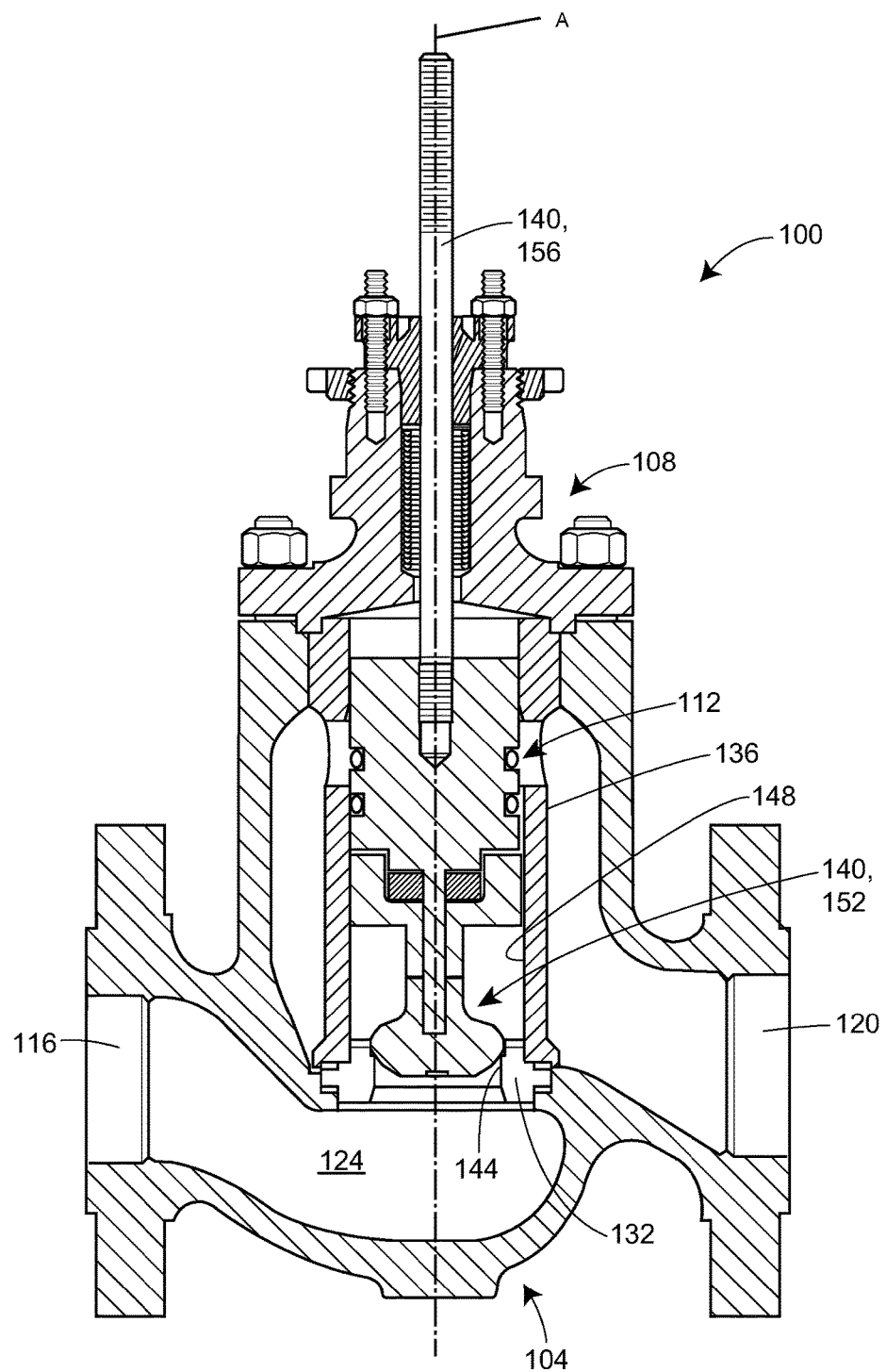
FIG. 1 is a cross-sectional view of a control valve having a thermally compensated valve trim component constructed in accordance with the teachings of the disclosure.

FIG. 1 depicts a control valve 100 constructed in accordance with the principles of the present disclosure. The control valve 100 is illustrated as being a sliding-stem type control valve that includes a globe-style valve body 104, a bonnet 108, and a valve trim assembly 112. The valve body 104 defines an inlet port 116, an outlet port 120, and a fluid flow path 124 extending between the inlet port 116 and the outlet port 120. The bonnet 108 is removably coupled to the valve body 104 via a plurality of fasteners. In turn, the bonnet 108 couples the valve body 104 to an actuator (not shown). The valve trim assembly 112 is disposed in the fluid flow path 124 between the inlet 116 and the outlet 120. With reference still to FIG. 1, the valve trim assembly 112 includes a valve seat 132, a one-piece or unitary valve cage 136, and a control element 140 movably (e.g., slidably) disposed in the valve body 104 for controlling the flow of fluid through the fluid flow path 124. The fluid may be a gas (e.g., air, natural gas) or a liquid (e.g., water, liquefied natural gas).

As illustrated in FIG. 1, the valve seat 132 is an annular valve seat ring disposed within the valve body 104. The valve seat 132 defines an orifice 144 through which the fluid flow path 124 passes. The valve cage 136 is a generally cylindrical structure that defines an interior bore 148. As is known in the art, the valve cage 136 can provide certain flow characteristics of the fluid (e.g., reduces noise and/or cavitation generated by the flow of fluid through the valve 100). To this end, the valve cage 136 can, for example, include one or more passages, apertures, or windows. The valve cage 136 is generally coupled to the valve seat 132 within the valve body 104. The valve seat 132 and the cage 136 can be bolted or secured together (e.g., via one or more screws), pinned together, welded together, frictionally coupled to one another, threaded to one another, or combinations thereof.

With reference still to FIG. 1, the control element 140 includes a flow control member such as a valve plug 152 connected to a valve stem 156. As will be described in greater detail below, the valve plug 152 includes or is formed of different portions made of different materials, but is specifically designed to accommodate the differential thermal expansion that typically occurs when using different materials in a way that maintains the structural integrity of the valve plug 152. The valve plug 152 is sized for insertion within the interior bore 148 and is movable along a longitudinal axis A between a closed position (FIG. 1), in which the valve plug 152 is positioned adjacent (e.g., engages) the valve seat 132 to prevent fluid from flowing through the fluid flow path 124, and an open position (not shown), in which the valve plug 152 is positioned or displaced apart or away from the valve seat 132 to allow fluid to flow through the fluid flow path 124. The valve stem 156 extends out of the valve body 104 through the bonnet 108 and can be coupled to the actuator (not shown), such that the actuator can adjust the position of the control element 140 and, more particularly, the position of the valve plug 152 relative to the flow path 124, to adjust the flow of fluid through the control valve 100.

In other examples, the control valve 100 can be a different type of control valve, such as, for example, an angle style control valve, a rotary control valve (e.g., a Fisher® Vee-Ball™ V150 valve, a Fisher® Vee-Ball™ V300 valve, etc.), a throttle valve, an isolation valve, or other control valve. Moreover, the components of the control valve 100 (e.g., the valve body 104, the valve seat 132, the valve cage 136, etc.) can vary from what is explicitly depicted herein. For example, the inlet 116, the outlet 120, and the fluid flow path 124 extending therebetween can vary in shape and/or size and yet still perform the intended functionality. As another example, the shape, size, and/or configuration of the valve seat 132 and the valve cage 136 can vary, as will be illustrated below. The valve cage 136 can, for example, be a two-piece cage that includes an upper cage portion and a lower cage portion.

Figure 2:
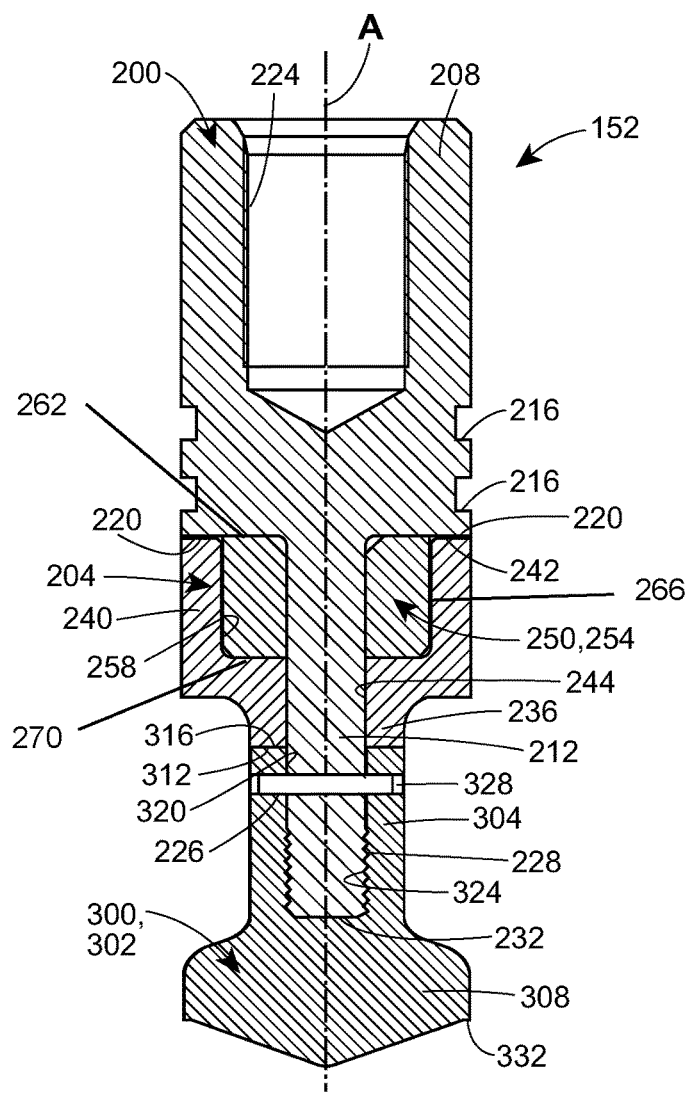
FIG. 2 is an enlarged, cross-sectional view of the thermally compensated valve trim component illustrated in FIG. 1.

FIG. 2 illustrates the multi-material valve plug 152 in greater detail. As illustrated in FIG. 2, the valve plug 152 includes a base 200 and a sleeve 204 coupled to the base 200. The base 200 in this example is defined by a substantially cylindrically-shaped body 208 and a cylindrical stud 212 that extends outwardly (downwardly, when viewed in FIG. 2) from the body 208. Two annular openings 216 are formed in an exterior surface of the body 208 and an annular shoulder 220 is defined by the body 208. Each of the annular openings 216 is sized to receive a sealing element (not shown). The annular shoulder 220 is structured and arranged to engage a corresponding portion of the sleeve 204, as will be described in greater detail below. An interior bore 224 is also defined in the body 208 for receiving an end of the valve stem 156 (see FIG. 1). The base 200 also includes a guide 226 coupled to (e.g., integrally formed on) the stud 212 and a plurality of threads 228 formed or defined on or proximate to an end 232 of the stud 212. It will be appreciated that the stud 212 and the interior bore 224 are, at least in this example, co-axial with one another, i.e., they are both oriented along the longitudinal axis A of the control valve 100.

The sleeve 204 in this example is defined by a cylindrical body 236 and a cylindrical wall 240 that extends outwardly (upwardly when viewed in FIG. 2) from the body 236 and terminates at an end 242. The end 242 is generally structured and arranged to engage the shoulder 220 of the base 200. An interior bore 244 is defined in the sleeve 204. The interior bore 244 is structured and arranged to receive a portion of the stud 212, as will be described below.

As discussed above, it may be desirable to manufacture a valve trim component, such as the valve plug 152, from two or more different materials. As described herein, the base 200 and the sleeve 204 are formed of different materials. In other words, the base 200 is made or formed of a first material, while the sleeve 204 is made or formed of a second material different from the first. The base 200 can, for example, be made of or from a high-strength material, such as, for example, titanium, stainless steel, a superalloy or a high-performance alloy like INCONEL™ (e.g., Inconel 718) or HASTELLOY™, another type of high-nickel alloy, some other alloy, or another suitable high-strength material. The sleeve 204 can, for example, be made of or from a less expensive but suitably strong material, such as, for example, Carbide, a ceramic material, or some other suitable material.

In any event, because different materials have different thermal expansion coefficients, the base 200 and the sleeve 204 have different thermal expansion coefficients, such that the base 200 and the sleeve 204 expand or contract relative to one another in response to thermal variations (e.g., temperature increases or decreases). In this example, the base 200 has a thermal expansion coefficient that is higher than the sleeve 204, such that the base 200 will expand or contract relative to the sleeve 204 in response to thermal variations. In other examples, though, this need not be the case (e.g., the base 200 can instead have a thermal expansion coefficient that is lower than the sleeve 204). While the differential thermal expansion or contraction between the base 200 and the sleeve 204 will of course vary depending on the exact materials used to manufacture the base 200 and the sleeve 204, it will be appreciated that this differential can be quite large, particularly when the valve trim assembly 112 is used at elevated temperatures. As discussed above, however, any such differential movement may compromise the characteristics of the control valve 100, and in some cases may cause the multi-material valve plug 152 to fail.

The valve plug 152 of the present disclosure thus includes a thermal compensating apparatus 250 that is arranged between the base 200 and the sleeve 204 to compensate for the thermal expansion differences between those parts and reduce the differential movement between the base 200 and the sleeve 204 that would typically affect the structural integrity of the valve plug 152. When the base 200 is made of a material having a thermal expansion coefficient that is higher than the material from which the sleeve 204 is made, the apparatus 250 can be made of a material that has a thermal expansion coefficient that is higher than the material used to manufacture the sleeve 204 (the thermal expansion coefficient may also, but need not, be higher than the coefficient for the base 200), such that the apparatus 250 compensates for, or helps to offset, the lower thermal expansion coefficient of the sleeve 204. Conversely, when the sleeve 204 is made of a material having a thermal expansion coefficient that is higher than the coefficient for the material from which the base 200 is made, the apparatus 250 can be made of a material that has a thermal expansion coefficient that is lower than the material used to manufacture the sleeve 204 (the thermal expansion coefficient may also, but need not, be lower than the coefficient for the base 200), such that the apparatus 250 compensates for, or offsets, the higher thermal expansion coefficient of the sleeve 204. In either case, the sleeve 204 and the apparatus 250 have a combined thermal expansion coefficient that is closer to, and more compatible with, the thermal expansion coefficient of the base 200 than the thermal expansion coefficient of the sleeve 204, on its own without the apparatus 250, would be. In other words, the difference between the combined thermal expansion coefficient of the sleeve 204 and the apparatus 250 and the thermal expansion coefficient of the base 200 is less than the difference between the thermal expansion coefficient of the sleeve 204, without the apparatus 250, and the base 200. In some cases, the apparatus 250 can be made of a material such that the combined thermal expansion coefficient of the sleeve 204 and the apparatus 250 is substantially equal to, or substantially matches, the thermal expansion coefficient of the base 200. In any event, the apparatus 250 minimizes the resultant thermal expansion differential throughout the valve plug 152, thereby reducing the differential movement that would otherwise occur between the base 200 and the sleeve 204 in response to thermal variations in the control valve 100.

In this example, the thermal compensating apparatus 250 takes the form of an annular insert or spacer 254 arranged within a gland 258 defined by and between the base 200 and the sleeve 204. The gland 258 is a negative or hollow space, such as, for example, a recess, indentation, or partial cavity, defined by the junctions or interfaces between surfaces of the base 200 and the sleeve 204. As illustrated in FIG. 2, the gland 258 in this example is defined between the junctions or interfaces between a surface 262 of the body 208 of the base 200, an interior portion 266 of the wall 240 of the sleeve 204, a surface 270 of the body 236 of the sleeve 204, and the stud 212 of the base 200.

Because in this example the base 200 has a higher thermal expansion coefficient than the sleeve 204, the thermally compensating insert 254 is made of a material, such as stainless steel (e.g., 300 series Stainless Steel) or another high expansion rate material, that has a higher thermal expansion coefficient than the sleeve 204 (and possibly the base 200, depending on the material of the base 200), such that the apparatus 250 compensates for the lower thermal expansion coefficient of the sleeve 204. As discussed above, the insert 254 thus helps to minimize differential movement between the base 200 and the sleeve 204 in response to thermal variations.

As illustrated in FIG. 2, the valve plug 152 further includes a fastening element 300 that serves to couple the sleeve 204 to the base 200 and retain the thermal compensation apparatus 250 within the gland 258. The fastening element 300 in this example is a plug tip 302 that is made of or from Alloy 6, but can instead be made of a different material, such as, for example, stainless steel, cast iron, various alloys, some other suitable material, or combinations thereof. The fastening element 300 includes a body portion 304 and a head portion 308 that extends outwardly of and downwardly from the body portion 304. An exterior surface 312 of the body 304 is sized and arranged to engage a corresponding exterior surface 316 of the body 236 of the sleeve 204. An interior bore 320, identical in shape and size to the bore 244, is defined in the body 304 of the fastening element 300. The interior bore 320 includes a plurality of threads 324. The interior bore 320 is sized and arranged to receive a portion of the stud 212, particularly the end 232 of the stud 212, with an opening 328 formed in the body 304 configured to receive the guide 226 formed on the stud 212 and the threads 324 configured to threadingly engage the threads 228 of the stud 212. Such a connection securely retains the stud 212 in place, but also provides additional stability to the valve plug 152. Finally, the head portion 308 defines a sealing surface 332 that is configured to engage a seating surface of the valve seat 132 when the valve plug 152 is in the closed position illustrated in FIG. 1.

Figure 3:
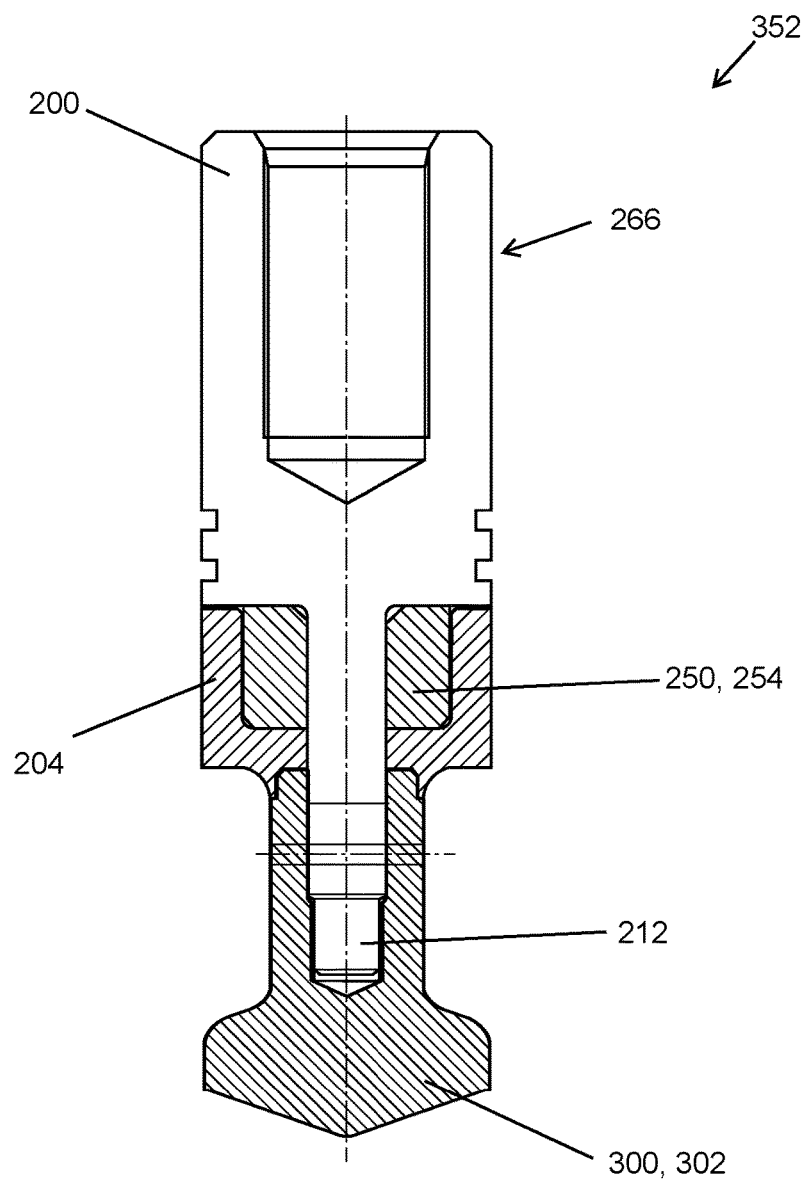
FIG. 3 is an enlarged, cross-sectional view of another example of a thermally compensated valve trim component constructed in accordance with the teachings of the disclosure.

It will be appreciated that the valve plug 152 can vary and yet still function as described herein. FIG. 3 illustrates one alternative example of a multi-material valve plug 352 constructed in accordance with one or more aspects of the present disclosure. The valve plug 352 is similar to the valve plug 152 described in connection with FIGS. 1 and 2, with similar components illustrated using similar reference numerals, but takes on a slightly different form. More particularly, in the valve plug 352, the fastening element 300 is welded or otherwise adhered to the stud 212 (which has a slightly different form than the stud 212 in FIGS. 1 and 2), rather than threaded to the stud 212 (as is the case for the valve plug 152). As such, the valve plug 352 does not include the threads 228 or the threads 324. The valve plug 352 also need not include the guide 226, as the valve plug 152 does. Other examples of multi-material trim components are conceivable as well. In other examples, the base 200, the sleeve 204, the thermal compensation apparatus 250, and the fastening element 300 can vary in shape, size, and/or construction. For example, the sleeve 204 need not include the guide 328. As another example, the thermal compensation apparatus 250 can be arranged in a gland having a different size and/or shape than the gland 258. In some examples, the thermal compensation apparatus 250 can take the form of one or more spring elements or biasing elements instead of the insert 254. The spring elements can be or include spiral wound gaskets, metal o-rings, Belleville washers, bolted caps, other spring elements, or combinations thereof. Moreover, in examples in which the sleeve 204 has a higher thermal expansion coefficient than the base 200, the apparatus 250 can be made of a material having a lower thermal expansion coefficient than the sleeve 204 (and possibly the base 200, depending on the material of the base 200). Further, the base 200, the sleeve 204, and/or the thermal compensation apparatus 250 can be coupled together in a different manner than described herein. The sleeve 204 can be coupled to the base 200 in a manner that does not require the fastening element 300 (e.g., the base 200 and the sleeve 204 can be welded or otherwise adhered together).

Finally, while FIGS. 1 and 2 of the present disclosure describe utilizing a thermal compensation apparatus in the valve plug 152, and FIG. 3 of the present disclosure describes utilizing a thermal compensation apparatus in the valve plug 352, it will be appreciated that the principles of the present disclosure can be applied to a different valve trim component (e.g., a valve seat) or any other multi-material component similarly exposed to thermal variations.

Based on the foregoing description, it should be appreciated that the valve trim component described herein includes an apparatus that compensates for a thermal expansion differential that arises when different portions of the valve trim component are made of different materials. The apparatus does so in a way that accommodates differential thermal expansion between different components, thereby allowing materials having different coefficients of thermal expansion to be used in the same component, while at the same time minimizing the effect that such thermal expansion can have on the integrity of the valve trim component.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

The invention claimed is:

1. A thermally compensated valve trim component of a valve trim assembly for a fluid flow control device, the valve trim component comprising:
    a base comprising a body and a stud each formed of a first material having a first thermal expansion coefficient, the stud extending outwardly from the body;
    a sleeve coupled to the base and formed of a second material having a second thermal expansion coefficient different from the first thermal expansion coefficient, the sleeve axially disposed between the body and an end of the stud such that the stud extends beyond the sleeve; and
    a thermal compensating apparatus arranged within a gland defined between the base and the sleeve, the thermal compensating apparatus being formed of a third material having a third thermal expansion coefficient different from the first and second thermal expansion coefficients such that the thermal compensating apparatus minimizes a resultant thermal expansion differential of the valve trim component.

2. The valve trim component of claim 1, further comprising a fastener secured to a portion of the base to couple the sleeve to the base.

3. The valve trim component of claim 2, wherein the stud extends through an interior bore formed in the sleeve.

4. The valve trim component of claim 3, wherein the thermal compensating apparatus surrounds a portion of the outwardly extending stud.

5. The valve trim component of claim 3, wherein the stud has a threaded portion configured to threadingly engage a mating threaded portion of the fastener.

6. The valve trim component of claim 1, wherein the sleeve is formed of Carbide.

7. The valve trim component of claim 1, wherein the first material is a superalloy material.

8. The valve trim component of claim 1, wherein the first thermal expansion coefficient is greater than the second thermal expansion coefficient, and wherein the third thermal expansion coefficient is greater than the second thermal expansion coefficient.

9. The valve trim component of claim 8, wherein the third thermal expansion coefficient is greater than the first thermal expansion coefficient.

10. A fluid flow control device, comprising:
    a valve body defining an inlet, an outlet, and a fluid flow path extending between the inlet and the outlet; and
    a valve trim assembly disposed within the valve body and comprising:
        a valve seat disposed within the valve body and defining an orifice through which the fluid flow path passes;
        a valve cage coupled to the valve seat within the valve body and defining an interior bore; and
        a flow control member sized for insertion into the interior bore of the valve cage and movable along an axis between a closed position, in which the flow control member engages the valve seat, and an open position in which the flow control member is spaced from the valve seat, the flow control member comprising
            a base formed of a first material having a first thermal expansion coefficient;

a sleeve coupled to the base and formed of a second material having a second thermal expansion coefficient different from the first thermal expansion coefficient;

a thermal compensating apparatus arranged within a gland defined between the base and the sleeve, the thermal compensating apparatus being formed of a third material having a third thermal expansion coefficient different from the first and second thermal expansion coefficients such that the thermal compensating apparatus minimizes a resultant thermal expansion differential of the flow control member; and a fastener secured to a portion of the base to couple the sleeve to the base, the fastener defining a sealing surface arranged to sealingly engage the valve seat when the flow control member is in the closed position.

11. The fluid flow control device of claim 10, wherein the base comprises an outwardly extending stud, the stud being disposed in an interior bore formed in the sleeve.

12. The fluid flow control device of claim 11, wherein the thermal compensating apparatus surrounds a portion of the outwardly extending stud.

13. The fluid flow control device of claim 11, wherein the stud has a threaded portion configured to threadingly engage a mating threaded portion of the fastener.

14. The fluid flow control device of claim 10, wherein the sleeve is formed of Carbide.

15. The fluid flow control device of claim 10, wherein the base is formed of a superalloy material.

16. The fluid flow control device of claim 10, wherein the first thermal expansion coefficient is greater than the second thermal expansion coefficient, and wherein the third thermal expansion coefficient is greater than the second thermal expansion coefficient.

17. The fluid flow control device of claim 10, wherein the base comprises a body and a stud extending outwardly from the body, and wherein the sleeve is axially disposed between the body and an end of the stud.

18. A thermally compensated valve trim component of a valve trim assembly for a fluid flow control device, the valve trim component comprising:

a base comprising a body and a stud extending outwardly from the body, the base being formed of a first material having a first thermal expansion coefficient;

a sleeve coupled to the base and comprising a body and a circumferential wall extending upwardly from the body of the sleeve, the sleeve being formed of a second material having a second thermal expansion coefficient different from the first thermal expansion coefficient;

a thermal compensating apparatus arranged within a gland defined between the stud of the base and the circumferential wall of the sleeve, the thermal compensating apparatus being formed of a third material having a third thermal expansion coefficient different from the first and second thermal expansion coefficients such that the thermal compensating apparatus minimizes a resultant thermal expansion differential of the valve trim component; and a fastener secured to a portion of the base to couple the sleeve to the base.

19. The valve trim component of claim 18, wherein the sleeve is axially disposed between the body of the base and the fastener.

20. The valve trim component of claim 18, wherein the stud of the base extends through the sleeve and has an end disposed in an aperture formed in the fastener.

* * * * *

UNITED STATES PATENT AND TRADEMARK OFFICE
CERTIFICATE OF CORRECTION

PATENT NO. : 9,995,400 B2
APPLICATION NO. : 14/995394
DATED : June 12, 2018
INVENTOR(S) : Jonathan W. Richardson et al.

Page 1 of 1

It is certified that error appears in the above-identified patent and that said Letters Patent is hereby corrected as shown below:

In the Specification

At Column 7, Lines 10-11, "the sleeve 204 need not include the guide 328." should be -- the base 200 need not include the guide 226. --.

Signed and Sealed this
Twenty-eighth Day of April, 2020

Andrei Iancu
*Director of the United States Patent and Trademark Office*